Aug. 27, 1968     G. K. HAUSE     3,398,604

POWER TRANSMISSION

Filed Nov. 15, 1966

INVENTOR.
Gilbert K. Hause
BY a.m. Heiter
ATTORNEY

3,398,604
POWER TRANSMISSION

Gilbert K. Hause, Bloomfield Hills, Mich., assignor to General Motors Corporation, Detroit, Mich., a corporation of Delaware
Filed Nov. 15, 1966, Ser. No. 594,451
5 Claims. (Cl. 74—688)

The present invention relates to automotive transmissions and more particularly to variable speed fluid torque converter and gear unit transmissions in which a high starting torque and a high speed range are required.

This transmission has a hydrokinetic torque converter and a gear unit. In a low ratio drive, the torque outputs from both the turbine and the reactor of a torque converter are combined and both are multiplied in the gear unit. The gear unit prevents reverse rotation of the reactor when the turbine is stalled and as the turbine speed increases, the reverse reactor speed increases at a slower rate, during the torque multiplication stage. This type of low ratio drive may be available in forward and reverse drives. In an intermediate ratio drive, the reactor is held and the turbine torque is multiplied in the gear unit. In a high drive the mechanical input torque and the turbine torque are combined in the gear unit.

An object of the present invention is to provide an improved torque converter and gearing transmission providing a high starting torque in the low speed drives by effective use of the gearing in combination with the forward torque of the torque converter turbine and the reverse torque of the torque converter reaction member.

Another object is to provide a fluid drive and gear unit having an efficient torque split between mechanical and hydraulic drive in the high speed forward drive range.

The nature of this invention as well as other objects and advantages thereof will be readily apparent from consideration of the following specification relating to the annexed drawings in which.

Figure 1:
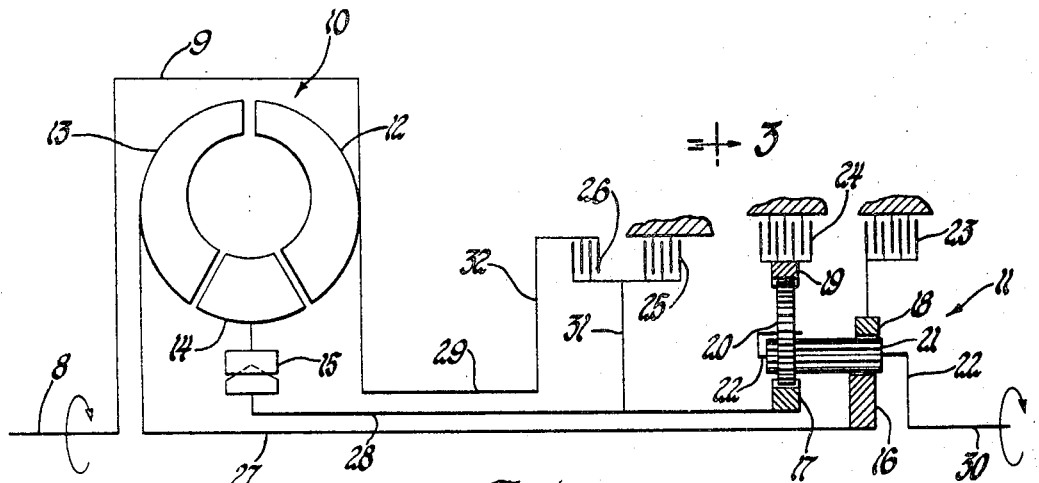
FIGURE 1 is a diagrammatic view of the transmission.

Referring now to the drawings, wherein like reference characters represent like or corresponding parts throughout the several views, there is shown in FIGURE 1 a torque converter 10, an epicyclic gearing 11 and associated components enclosed in a transmission case. The torque converter 10 is of conventional design and construction and comprises an impeller 12 attached to an engine, not shown, by means of an input shaft 8 and a housing 9, a turbine 13 and a reactor 14. When the torque converter is filled with fluid, the impeller is rotated by the engine through input shaft 8 and housing 9 thereby causing the fluid to circulate within the torque converter. The fluid leaving the impeller 12 has a high energy which is partially absorbed by the turbine 13 and delivered to the epicyclic gearing 11 in the form of speed and torque. The reactor 14 receives the fluid from the turbine 13 and redirects it to the impeller. A torque component, in a direction opposite to that of the turbine 13, is imparted to the reactor 14 by the fluid. As in conventional torque converters, the torque component on the reactor 14 is reversed as the turbine speed is increased thereby causing the reactor 14 to rotate forwardly and cease transmitting torque. However, the turbine speed at which the reactor changes rotational direction is lower than conventional torque converters because of the initial reverse rotation of the reactor.

The turbine 13 is drive connected to a drive shaft 27. The reactor 14 is operatively connected, through a one-way torque establishing device 15, to an intermediate shaft 28 which is rotatably journaled on the drive shaft 27. The impeller 12 is drive connected to an intermediate shaft 29 which is rotatably journaled on intermediate shaft 28.

The intermediate shaft 28 has attached thereto a drum 31 which includes a part of a high clutch 26 and an intermediate brake 25. The intermediate shaft 29 has attached thereto a drum 32 which includes a part of the high clutch 26. When the intermediate brake 25 is engaged, the intermediate shaft 28 is held against rotation. Also, the reactor 14 is held against reverse rotation by the one-way torque establishing device 15 and the intermediate shaft 28. When the high clutch 26 is engaged, the intermediate shaft 28 is driven forwardly by impeller 12, intermediate shaft 29 and drum 32. When neither clutch 26 nor brake 25 is engaged, the intermediate shaft 28 may be rotated in a direction opposite to the impeller 12 by the reactor 14 and the one-way torque establishing device 15.

The epicyclic gearing includes a carrier 22 drive connected to a driven shaft 30 and having a plurality of long pinions 21 and a plurality of short pinions 20 rotatably mounted thereon. The long pinions 21 mesh with a sun gear 16 which is drive connected to drive shaft 27, a ring gear 18 which is operatively connected to a low brake 23, and short pinions 20. The short pinions 20 mesh with a sun gear 17 which is drive connected to intermediate shaft 28, and a ring gear 19 which is operatively connected to a reverse brake 24.

Figure 2:
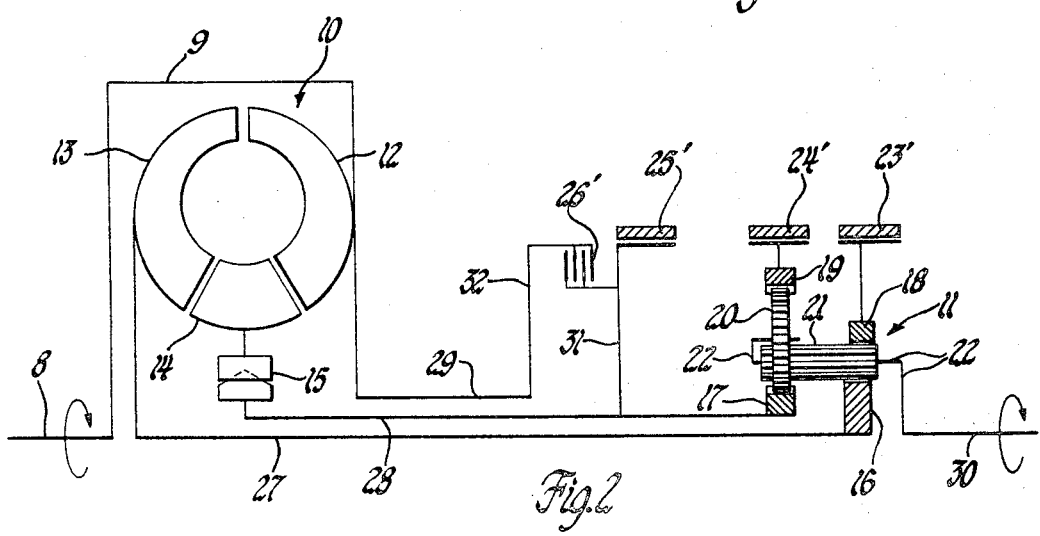
FIGURE 2 is a diagrammatic view of the transmission showing a modification.
Figure 3:
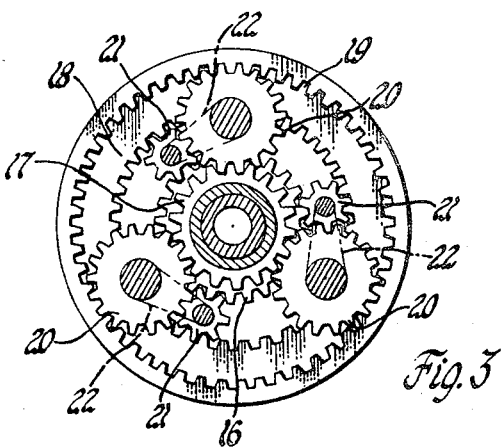
FIGURE 3 is a section view on the line 3—3 of FIGURE 1 showing the epicyclic gearing.

The one-way torque establishing device 15 may be of any well-known design. The clutch 26 may be a multiple disc, hydraulically actuated type wherein inner and outer drums are drive connected to alternating friction plates. The clutch is actuated by a hydraulic presser plate which applies a normal force to the friction plates, whereby the inner and outer drums may be rotated as a unit. The brakes 23, 24 and 25 may be multiple disc hydraulically actuated type wherein inner and outer drums are drive connected to alternating friction plates. Either the inner or outer drum is a stationary element such as the transmission casing. The brake is actuated by a hydraulic presser plate which applies a normal force to the friction plates, whereby the inner and outer drums are restrained from rotating. When the fluid pressure is exhausted, conventional retraction springs release the brakes. The brakes 23′, 24′ and 25′, as shown in FIGURE 2, may be flexible band hydraulically actuated servo motor type wherein the member to be held from rotating is drive connected to a drum. A flexible band, having an inner friction surface, encircles the drum. One end of the band is attached to a stationary element such as the transmission housing; the other end of the band is attached to a hydraulic servo motor. When the servo motor is actuated, the band tightens on the drum thereby preventing rotation of the drum.

When neither the clutch nor brakes are engaged the transmission is in neutral and no torque is transmitted to the driven shaft 30. To establish a forward drive condition in the low speed ratio low brake 23 is engaged, thereby preventing rotation of ring gear 18. Torque is transmitted from the impeller 12 to the turbine 13, drive shaft 27, sun gear 16, pinion gears 21 and ring gear 18. Since the ring gear 18 cannot rotate, the pinion gears 21 are urged to "walk around" the inside of the ring gear 18 thereby transmitting the torque to the carrier 22 and driven shaft 30. The fluid leaving the turbine 13 imposes a reverse torque on the reactor 14. The reactor torque is transmitted through the one-way torque establishing device 15 to intermediate shaft 28, sun gear 17, planet pinions 20, planet pinions 21, and ring gear 18. Since ring gear 18 is held stationary, the torque is transmitted, by the planetary action, to the carrier 22, and driven shaft 30. The torque transmitted by sun gear 17 is opposite in direction to the torque transmitted by sun gear 16, however, due to the compound planetary action of pinions 20 and 21, the torque transmitted to the carrier 22 by sun gear 17 is in the same direction as that transmitted by sun gear 16 to the carrier. When the torque converter is stalled, the maximum amount of torque will be delivered to the driven shaft 30. When the load restraining the driven shaft from rotating is overcome, the turbine and reactor will begin rotating. As the turbine increases in speed, the torque transmitted will diminish until the "coupling point" of the converter is reached; at which "point," the reactor 14 will begin rotating in the same direction as the turbine 13, thereby "overrunning" the one-way device 15, and cease transmitting torque through the gearing. The torque transmission will be through the turbine 13, as described above.

To establish the intermediate or second speed ratio, intermediate brake 25 is engaged while brakes 23, 24 and clutch 26 are disengaged, thereby preventing rotation of sun gear 17, and intermediate shaft 28, also preventing reverse rotation of reactor 14. Torque is transmitted from the impeller 12 to the turbine 13, the drive shaft 27, the sun gear 16, and pinion gears 21 and 20. Since the sun gear 17 is restrained from rotating, the planet pinion 20 is urged to "walk around" sun gear 17 thereby transmitting torque to carrier 22 and driven shaft 30. The reactor 14 may be either stationary, held from rotation by the one-way device 15, or rotating in the same direction as the turbine 13 by "overrunning" the one-way device 15.

To establish the high or third speed ratio, the high clutch 26 is engaged while the brakes 23, 24 and 25 are disengaged. When high clutch 26 is engaged, the impeller 12 is drivingly connected to the intermediate shaft 28 and sun gear 17. The torque is split in two paths, one mechanical and the other hydraulic. The mechanical portion is from impeller 12 to shaft 29, clutch 26, shaft 28 and sun gear 17. The hydraulic portion is through impeller 12 to turbine 13, shaft 27 and sun gear 16. Since both sun gears 16 and 17 are rotated in the same direction at substantially the same speed, the epicyclic gearing is almost one to one; the torque is recombined and transmitted through the gearing to the carrier 22 and driven shaft 30. The percentage of the total torque to be transmitted by the hydraulic path or the mechanical path is determined by the number of teeth on the sun gear 17 and the sun gear 16.

To establish reverse drive, reverse brake 24 is engaged while clutch 26 and brakes 23 and 25 are disengaged. When reverse brake 24 is engaged, ring gear 19 is restrained from rotating. Torque is transmitted from the impeller 12 to the turbine 13, drive shaft 27, sun gear 16, and planet pinions 21 and 20. Since the ring gear 19 cannot rotate, the pinion 20 is urged to "walk around" the inside of ring gear 19 thereby transmitting the torque to the carrier 22 and driven shaft 30. Due to the compound planetary action, the direction of the torque transmitted to the carrier 22 is opposite to the torque transmitted to sun gear 16. The fluid leaving the turbine 13 imposes a reverse torque on the reactor 14. The reactor torque is transmitted through the one-way device 15 to shaft 28, sun gear 17, and planet pinions 20. Since ring gear 19 cannot rotate, the planet pinions 20 also are urged to "walk around" the inside of ring gear 19 by the reactor torque thereby transmitting the torque to carrier 22 and output shaft 30, whereby the torque transmitted to the carrier from the turbine is increased. As in the low speed ratio, the torque transmitted slowly decreases as the turbine increases in speed from stall to "coupling point" at which "point" the turbine alone transmits torque, as described above.

If the number of teeth of the gears are selected as follows:

| Gear | No. | No. of Teeth |
|---|---|---|
| Sun gear | 16 | 32 |
| Do | 17 | 25 |
| Pinion gear | 21 | 16 |
| Do | 20 | 23 |
| Ring gear | 18 | 64 |
| Do | 19 | 71 | and combined with a torque converter having a 2.5:1 multiplying ratio, the following torque ratio (output torque/input torque) will be obtained.

| Speed Range | Ratio with Converter | |
|---|---|---|
| | Stalled | Coupled |
| Low | 9.8 | 3.0 |
| Intermediate | 4.4 | 1.8 |
| High | | 1.0 |
| Reverse | 8.9 | 1.2 |

With the above gearing the torque split in the high speed range would be 44% mechanical and 56% hydraulic.

Obviously, many modifications and variations of the present invention are possible in the light of the above teachings. It is therefore to be understood, that within the scope of the appended claims, the invention may be practiced otherwise than as specifically described.

What is claimed is:

1. A transmission comprising in combination a torque converter having an input member, an output member and a reaction member, a drive shaft operatively connected to said output member, a driven shaft, epicyclic gearing means operatively connected between the shafts and having a plurality of reaction elements operative when held to establish a plurality of forward speed and torque ratios and at least one reverse speed ratio and transmitting a hydrodynamic torque component from said drive shaft to said driven shaft, means for selectively holding said reaction elements of the epicyclic gearing means from rotating for selectively establishing forward speed and torque ratios and at least one reverse speed ratio; means for operably connecting said reaction member to an element of said epicyclic gearing means for transmitting a hydrodynamic torque component from said reaction member to said epicyclic gear means and said driven shaft in addition to said torque component transmitted by the epicyclic gearing means from the drive shaft to the driven shaft during a forward and a reverse speed and torque ratio.

2. The transmission defined in claim 1 and further comprising a friction drive means selectively operably connecting said input member to an element of said epicyclic gearing means for transmitting a mechanical torque component from said input member to said epicyclic gearing means and said driven shaft, said mechanical torque component being combined with said hydrodynamic torque component transmitted from said drive shaft to said driven shaft to provide substantially a one to one ratio.

3. A transmission comprising in combination a torque converter having an input member, an output member and a reaction member, a drive shaft drive connected to said output member, a driven shaft, epicyclic gearing means having a first sun gear drive connected to said drive shaft and receiving a torque component therefrom, a plurality of first planet pinions meshing with said first sun gear and rotatably mounted on a carrier drivingly connected to said driven shaft, a second sun gear operatively connected to said reaction member and receiving a torque component therefrom, a plurality of second planet pinions meshing with said second sun gear and said first planet pinions and rotatably mounted on said carrier, a first ring gear meshing with said first planet pinions, means selectively operable to hold said first ring gear stationary to provide a forward low speed and a high torque ratio in which the torque components from the drive shaft and the reaction member are combined and transmitted to the driven shaft by the epicyclic gearing means, a second ring gear, means selectively operable to hold said second ring gear stationary to provide a reverse low speed and high torque ratio in which the torque components from the drive shaft and the reaction member are combined and transmitted to the driven shaft by the epicyclic gearing means.

4. The transmission defined in claim 3 and further comprising a friction drive means selectively operably connecting said input member to said second sun gear and transmitting a torque component thereto, said torque component being combined in said epicyclic gearing means with said torque component received by said first sun gear and transmitted to said driven shaft in substantially a one to one ratio.

5. The transmission defined in claim 3 and further comprising means selectively operable to hold said second sun gear stationary to provide an intermediate forward speed ratio.

References Cited
UNITED STATES PATENTS

| | | | |
|---|---|---|---|
| 2,519,022 | 8/1950 | Burtnett | 74—688 |
| 2,775,144 | 12/1956 | Kelbel | 74—769 |
| 3,020,781 | 2/1962 | Burtnett | 74—688 |
| 3,307,431 | 3/1967 | Hungerford | 74—769 |

FRED C. MATTERN, JR., *Primary Examiner.*

ARTHUR T. McKEON, *Assistant Examiner.*